US012737190B2

(12) United States Patent
Junkins et al.

(10) Patent No.: US 12,737,190 B2
(45) Date of Patent: Sep. 15, 2026

(54) STREAMING WAVE COALESCER CIRCUIT

(71) Applicant: ADVANCED MICRO DEVICES, INC., Santa Clara, CA (US)

(72) Inventors: John Stephen Junkins, Bend, OR (US); Christopher J. Brennan, Boxborough, MA (US); Ian Richard Beaumont, Lindfield (AU); Kellie Marks, Manly (AU); Matthaeus G. Chajdas, Munich (DE); Max Oberberger, Munich (DE); Michael John Bedy, Groton, MA (US); Michael Mantor, Orlando, FL (US); Sean Keely, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 254 days.

(21) Appl. No.: 18/536,982

(22) Filed: Dec. 12, 2023

(65) Prior Publication Data

US 2025/0068429 A1 Feb. 27, 2025

Related U.S. Application Data

(60) Provisional application No. 63/533,970, filed on Aug. 22, 2023.

(51) Int. Cl.
*G06F 9/38* (2018.01)

(52) U.S. Cl.
CPC ........ *G06F 9/38885* (2023.08); *G06F 9/3888* (2023.08)

(58) Field of Classification Search
CPC ...... G06F 9/3887; G06F 9/38885; G06T 1/20
See application file for complete search history.

(56) References Cited

U.S. PATENT DOCUMENTS

2014/0149710 A1* 5/2014 Rogers .................. G06F 9/3851 711/170
2015/0095914 A1* 4/2015 Mei ......................... G06F 9/522 718/102
2015/0128144 A1* 5/2015 Mansell ................ G06F 9/3851 718/104

(Continued)

OTHER PUBLICATIONS

Barczak et al., "Intel® Arc™M Graphics Developer Guide for Real-time Ray Tracing in Games" Intel Developer Guide, 2023, 29 pages.

(Continued)

*Primary Examiner* — Courtney P Spann

(57) ABSTRACT

A Streaming Wave Coalescer (SWC) circuit stores a first set of state values associated with a first subset of threads of a first wave in a bin based on each of the first subset of threads including a first set of instructions to be executed. A second set of state values associated with a second subset of threads of a second wave is stored in the bin based on each of the second subset of threads including the first set of instructions to be executed and based on the first wave and the second wave both being associated with a hard key. A third wave is formed from the threads of the first subset and the second subset and is emitted for execution. As a result of reorganizing the threads and reconstituting a different wave, thread divergence of waves sent for execution is reduced.

20 Claims, 6 Drawing Sheets

(56) References Cited

U.S. PATENT DOCUMENTS

| | | | | |
|---|---|---|---|---|
| 2015/0221123 | A1* | 8/2015 | Sloan | G06T 15/06 |
| | | | | 345/426 |
| 2020/0004585 | A1* | 1/2020 | Saleh | G06F 9/4881 |
| 2020/0151936 | A1* | 5/2020 | Gierach | G06T 15/005 |
| 2020/0409695 | A1* | 12/2020 | Oldcorn | G06F 9/3005 |

OTHER PUBLICATIONS

"Shader Execution Reordering," 2022 Nvidia Corporation, 20 pages.

* cited by examiner

STORE FIRST SET OF STATE VALUES ASSOCIATED WITH FIRST SUBSET OF THREADS OF FIRST WAVE IN A BIN
602

STORE SECOND SET OF STATE VALUES ASSOCIATED WITH SECOND SUBSET OF THREADS OF SECOND WAVE IN THE BIN
604

FORM THIRD WAVE FROM THREADS ASSOCIATED WITH STATE VALUES STORED IN THE BIN
606

EMIT THIRD WAVE FOR EXECUTION
608

STREAMING WAVE COALESCER CIRCUIT

BACKGROUND

Processing units such as a graphics processing unit (GPU), a central processing unit (CPU), or other parallel processors typically implement multiple processing elements, in some cases referred to as compute units in the case of the GPU and processor cores in the case of a CPU, that execute instructions concurrently or in parallel. For example, the compute units in a GPU execute a kernel including a number of workgroups, each workgroup including a number of threads, as multiple threads executing the same instructions on different data sets. The instructions in the kernel represent shaders that perform graphics processing, neural networks that perform machine learning tasks, and the like. In some cases, as threads are executed, the instructions of those threads diverge (e.g., due to branch instructions that are taken for some threads but not others).

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Figure 1:
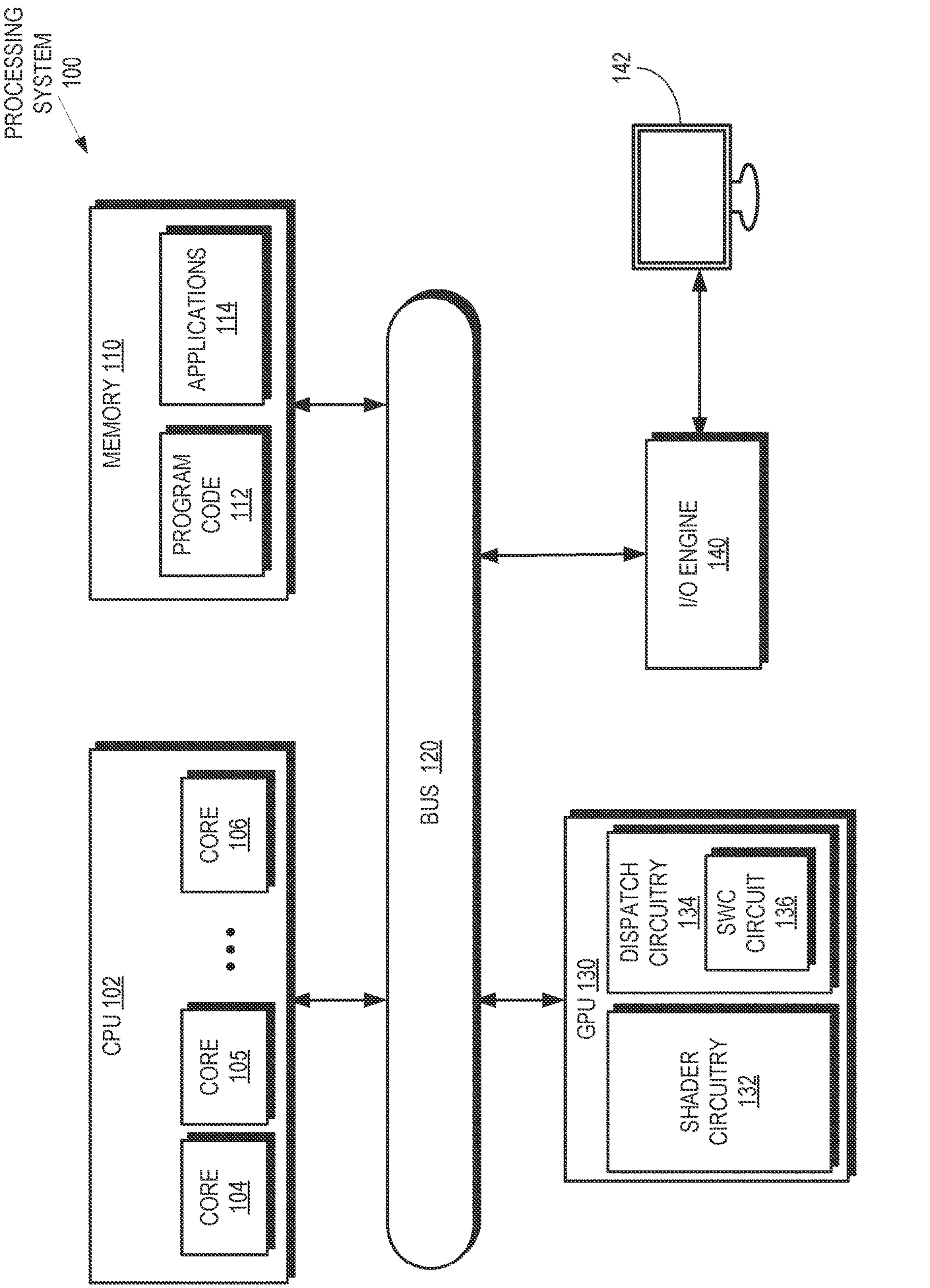
FIG. 1 is a block diagram of a processing system that includes a streaming wave coalescer circuit in accordance with some implementations.

As part of execution, in some cases a wave including a plurality of threads experiences divergence of the threads, where different threads proceed along different execution paths. This divergence slows overall execution of the wave as the compute units executing the different threads execute the diverged threads sequentially, rather than in parallel. Further, because divergence tends to increase over time, thread divergence increasingly slows execution, as compared to a wave experiencing little or no thread divergence. In some implementations, a Streaming Wave Coalescer (SWC) circuit reorders and reconstitutes single instruction multiple thread (SIMT) waves by sorting threads of the SIMT waves using integer lane key values, which are also called sort keys herein. The sort keys are indicative of different groups of instructions to be executed. The SWC circuit employs wave intrinsics to find subgroups of matching sort keys within waves and then merges these subgroups into sort bins associated with the respective sort keys. More specifically, in some implementations, the SWC circuit receives waves and stores sets of state values corresponding to threads in subsets of the waves in different sort bins, where each sort bin corresponds to one or more sort keys. In some implementations, the state values are data of the threads. In some cases, when a sort key of a received wave corresponds to a partially filled sort bin, the state values of the threads of the received wave are used to continue to fill the partially filled sort bin. Fully populated bins are emitted by the SWC circuit as reconstituted waves for execution by processing circuitry such as shader circuitry.

As a result, the SWC circuit forms waves of more homogeneous shader threads that expect to perform similar or the same execution paths (e.g., a same set of instructions), reducing thread divergence. Accordingly, in some implementations, the SWC circuit enables higher execution efficiency of code subject to thread divergence (e.g., GPU shader code). Further, because the SWC circuit intercepts and reorganizes waves and then emits complete waves, the SWC circuit is easier to integrate into dispatch pipelines without changing other portions of the dispatch pipelines (e.g., fixed function dispatch logic).

The techniques described herein are, in different implementations, employed using any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). For ease of illustration, reference is made herein to example systems and methods in which certain processing circuits are employed. However, it will be understood that the systems and techniques described herein apply equally to the use of other types of parallel processors unless otherwise noted.

Referring now to FIG. 1, a processing system 100 that includes a SWC circuit 136 is presented, in accordance with some implementations. Processing system 100 includes or has access to memory 110 or other storage component implemented using a non-transitory computer-readable medium such as a dynamic random-access memory (DRAM). However, in some implementations, memory 110 is implemented using other types of memory including, for example, static random-access memory (SRAM), nonvolatile RAM, and the like. According to some implementations, memory 110 includes an external memory implemented external to the processing units implemented in the processing system 100. Processing system 100 also includes bus 120 to support communication between entities implemented in processing system 100, such as memory 110. Some implementations of processing system 100 include other buses, bridges, switches, routers, and the like, which are not shown in FIG. 1 in the interest of clarity.

The techniques described herein are, in different implementations, employed at graphics processing unit (GPU) 130. GPU 130 includes, for example, vector processors, coprocessors, graphics processing units (GPUs), general-purpose GPUs (GPGPUs), non-scalar processors, highly parallel processors, artificial intelligence (AI) processors, inference engines, machine-learning processors, other multithreaded processing units, scalar processors, serial processors, programmable logic devices (simple programmable logic devices, complex programmable logic devices, field programmable gate arrays (FPGAs), or any combination thereof. FIG. 1 illustrates an example of a parallel processor, and in particular GPU 130, in accordance with some implementations. In some implementations, GPU 130 renders images for presentation on display 142. For example, GPU 130 renders objects to produce values of pixels that are provided to display 142, which uses the pixel values to display an image that represents the rendered objects. In some implementations, rather than sending values to display 142 via input/output (I/O) engine 140 as illustrated in FIG. 1, GPU 130 sends values to display 142 directly.

GPU 130 includes shader circuitry 132 that implements a plurality of execution units (e.g., shader engines) that are each able to execute one or more instructions separately or in parallel. In some implementations, shader circuitry 132 includes execution units implemented as one or more single-instruction-multiple-data (SIMD) units, compute units, processor cores, and the like. For example, in some implementations shader circuitry 132 includes one or more execution units to perform operations for one or more instructions in parallel received from a graphics pipeline. To facilitate the performance of operations by the compute units, GPU 130 includes one or more command processors (not shown for clarity). Such command processors, for example, include circuitry configured to execute one or more instructions from a graphics pipeline by providing data indicating one or more operations, operands, instructions, variables, register files, or any combination thereof to one or more compute units necessary for, helpful for, or aiding in the performance of one or more operations for the instructions. In the illustrated implementation, the command processors include dispatch circuitry 134, which is used to provide groups of instructions used for SIMT execution such as single instruction multiple thread (SIMT) execution, referred to herein as "threads," which are organized into groups, referred to herein as "waves," to execution units of shader circuitry 132. As further discussed below with reference to FIGS. 2-6, in various implementations, SWC circuit 136 of dispatch circuitry 134 reorganizes groups of threads within waves, reducing thread divergence. Some implementations of GPU 130 are used for general-purpose computing. For example, in embodiments, GPU 130 receives one or more instructions, such as program code 112, from one or more applications 114 that indicate operations associated with, for example, one or more video tasks, physical simulation tasks, computational tasks, fluid dynamics tasks, or any combination thereof. In response to receiving program code 112, GPU 130 executes the instructions for the video tasks, physical simulation tasks, computational tasks, and fluid dynamics tasks. GPU 130 then stores information in memory 110 such as the results of the executed instructions.

In some implementations, processing system 100 includes input/output (I/O) engine 140 that includes circuitry to handle input or output operations associated with display 142, as well as other elements of the processing system 100 such as keyboards, mice, printers, external disks, and the like. I/O engine 140 is coupled to bus 120 so that I/O engine 140 communicates with memory 110, GPU 130, central processing unit (CPU) 102, or any combination thereof.

In some implementations, processing system 100 also includes CPU 102 that communicates with GPU 130 and memory 110 via bus 120. CPU 102 implements a plurality of processor cores 104, 105, and 106 that execute instructions concurrently or in parallel. In various implementations, one or more of the processor cores 104 operate as SIMD units that perform the same operation on different data sets. Though in the example implementation illustrated in FIG. 1, three processor are presented, the number of processor cores implemented in CPU 102 is a matter of design choice. As such, in other implementations, CPU 102 can include any number of processor cores. In some implementations, CPU 102 has an equal number of processor cores as GPU 130 has execution units in shader circuitry 132. In other implementations, the number of processor cores of CPU 102 differs from the number of execution units in shader circuitry 132 of GPU 130. Processor cores 104, 105, and 106 of CPU 102 execute instructions such as program code 112 for one or more applications 114 (e.g., graphics applications, compute applications, machine-learning applications) stored in memory 110, and CPU 102 stores information in memory 110 such as the results of the executed instructions. In some implementations, CPU 102 initiates processing at GPU 130 such as by issuing draw calls to GPU 130. In some cases, instructions sent from CPU 102 to GPU 130 cause GPU 130 to send groups of threads to shader circuitry 132 as waves. In some implementations, CPU 102 runs user software or includes an application programmer interface (API) that enables users to specify features of threads or waves, such as hard keys, sort keys, or whether SWC circuit 136 should reorganize threads of a group of waves (e.g., because the user expects an unacceptable amount of thread divergence).

Figure 2:
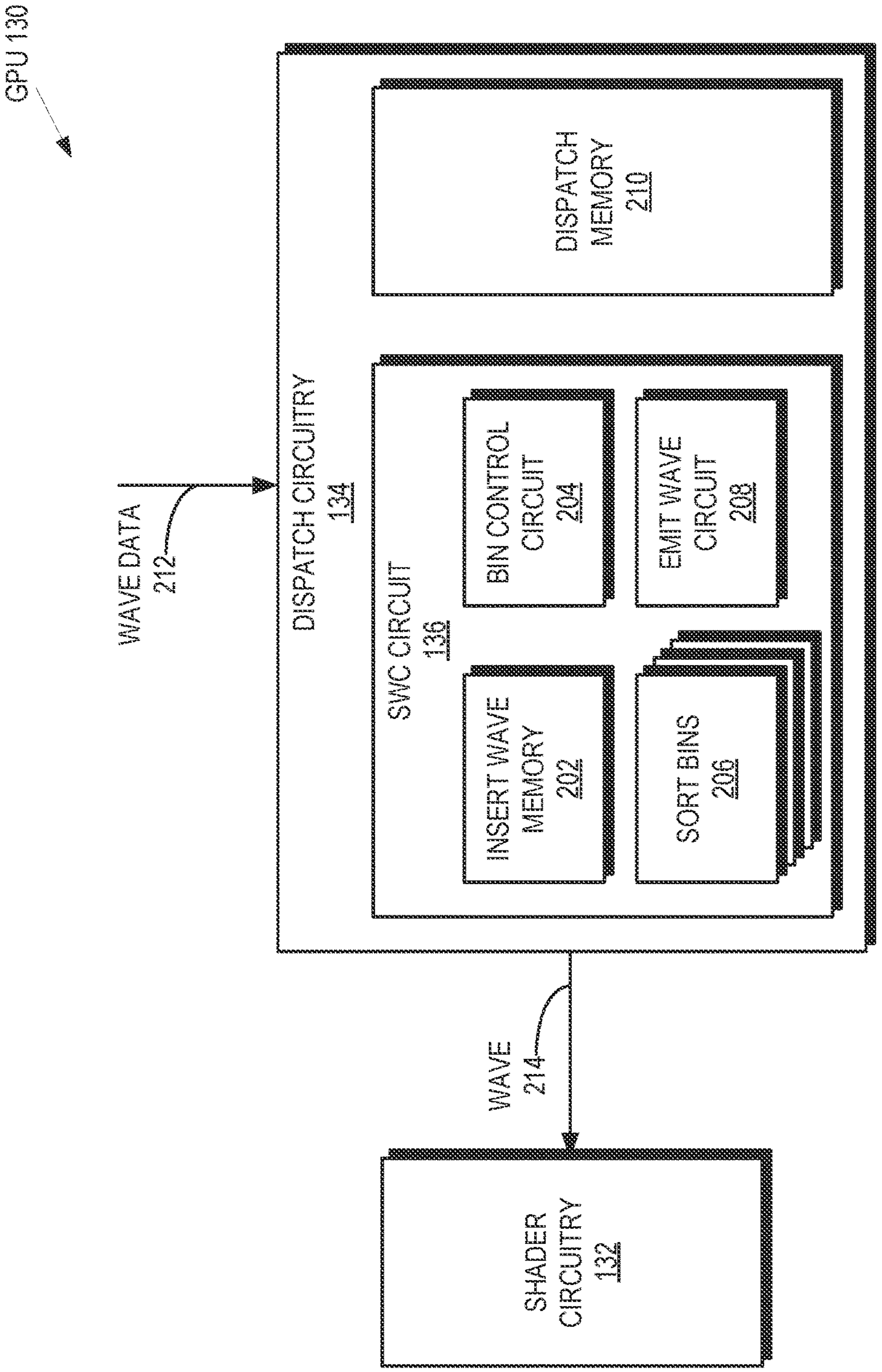
FIG. 2 is a block diagram of example processing circuitry that implements a streaming wave coalescer circuit in accordance with some implementations.

FIG. 2 is a block diagram illustrating GPU 130 of FIG. 1 that includes an example SWC circuit 136. In some implementations, GPU 130 is a subset of processing system 100 of FIG. 1. For example, in the illustrated implementation, GPU 130 includes shader circuitry 132, dispatch circuitry 134, and SWC circuit 136 of FIG. 1. However, in other implementations, GPU 130 corresponds to a different system that includes additional or fewer components than processing system 100. In the illustrated implementation, dispatch circuitry 134 includes SWC circuit 136 and dispatch memory 210. SWC circuit 136 includes insert wave memory 202, bin control circuit 204, sort bins 206, and emit wave circuit 208. Although the illustrated implementation shows a specific configuration of components, in various implementations, other combinations or arrangements of components are contemplated. For example, in some implementations, GPU 130 includes memory circuitry that stores reorganized waves emitted by SWC circuit 136. As another example, in some implementations, SWC circuit 136 is separate from GPU 130.

As discussed above with reference to FIG. 1, shader circuitry 132 includes one or more execution units that are each able to execute one or more instructions separately or in parallel. Threads, groups of instructions, are further grouped into waves such as wave 214, which are sent to shader circuitry 132 for execution. When a group of threads of a wave share a same set of instructions (i.e., the threads do not have thread divergence), shader circuitry 132 executes those threads in parallel. However, when some threads of the wave have different instructions (e.g., due to branch instructions taken in some executions and not taken in others), shader circuitry 132 executes each group of threads having different instructions separately, potentially increasing execution time of the wave. Accordingly, it is desirable to reduce or eliminate thread divergence within waves sent to shader circuitry 132.

Dispatch circuitry 134 organizes and schedules instructions into waves for execution by shader circuitry 132. Wave data, such as wave data 212, is received at dispatch circuitry (e.g., from memory circuitry of GPU 130, from an instruction received from another circuit such as one of cores 104-106, or from another processing circuit such as shader circuitry 132). The wave data is stored at dispatch memory 210. In response to a wave request, dispatch circuitry 134 retrieves a wave from dispatch memory 210 and sends wave 214 to shader circuitry 132. In some implementations, the wave request is received from shader circuitry 132 directly. In other implementations, the wave request is received from another circuit, such as a portion of a command processor of GPU 130. In other implementations, the wave request is not received at all and instead dispatch circuitry 134 is to periodically send a wave to shader circuitry 132 (e.g., every clock cycle).

As discussed above, in some cases it is desirable to reduce or eliminate thread divergence within waves. In various implementations, SWC circuit 136 is used to reorganize threads within waves so as to reduce or eliminate thread divergence. In some implementations, SWC circuit 136 receives wave data (e.g., wave data 212) received at dispatch circuitry 134 and reorganizes the threads prior to the wave data being stored at dispatch memory 210. In other implementations, SWC circuit 136 operates on wave data already stored at dispatch memory 210 or intercepts wave data being sent from dispatch memory to shader circuitry 132.

As further discussed below with respect to FIGS. 3-5, insert wave memory 202 receives a wave, including indications of state values associated with threads of the wave and corresponding sort keys indicative of groups of instructions to be executed as part of execution of the respective threads. Further, in some implementations, insert wave memory 202 receives a hard key indicative of a separation between waves (e.g., indicative of different applications, dispatches, or thread-groups). Bin control circuit 204 separates the threads into subsets based on the corresponding sort keys and stores the state values in sort bins 206. As additional threads are received, sort bins 206 fill with state values corresponding to one or more sort keys. In some cases, one or more of sort bins 206 only correspond to a single sort key at a time. When a sort bin is filled, bin control circuit 204 causes contents of the sort bin to be transferred to emit wave circuit 208, where the corresponding group of threads are reconstituted into a wave and emitted as an SWC wave (e.g., a wave having a same format as a wave received at a SWC circuit but renamed for clarity herein). As a result, dispatch circuitry 134 reorganizes and reconstitutes received waves into waves having less thread divergence. In some implementations, sort bins 206 and emit wave circuit 208 include a number of entries equal to a SIMT wave side of a wave feed of the SWC circuit. In various implementations, sort bins 206 are separate memory circuits or portions (e.g., cache lines) of a single memory circuit.

In some implementations, SWC circuit 136 operates on a wave in response to an instruction from a user (e.g., an application programmer). In other words, SWC circuit 136 operates on a wave in response to a user indicating that the threads of the wave have likely diverged by at least a threshold amount. In some implementations, SWC circuit 136 operates on a wave in response to another indication, such as an indication from a compiler that the threads of the wave have diverged by at least a threshold amount (e.g., that waves likely include at least three sort keys or waves likely include at least one hundred sort keys). Further, in some implementations, the sort keys are received from a user. For example, in some implementations a user indicates thread divergence by representing the thread divergence as a per lane integer sort key which is then passed to SWC circuit 136 for reorganization. In other implementations, the sort keys are automatically specified (e.g., by a compiler based on detecting differing sets of instructions in two threads).

As mentioned above, in some implementations, SWC circuit 136 receives hard keys indicative of a separation between waves. When hard keys are received, SWC circuit 136 ensures that threads corresponding to different hard keys are not mixed by indexing the sort bins using the hard keys. As a result, even if two threads share a same sort key, if they have different hard keys, they are placed in different sort bins, preventing the threads from being issued together as part of a same reconstituted wave. In some implementations, hard keys are generated by system software such as a compiler or driver. In other implementations, hard keys are programmable (e.g., hard keys are received from a programmer or user).

In some implementations, in response to receiving a wave with no thread divergence (e.g., all threads in the wave share a same sort key and, if applicable, a same hard key), SWC circuit 136 sends the wave to emit wave circuit 208 to be emitted as an SWC wave. Further, in some implementations, SWC circuit 136 (e.g., sort bins 206, emit wave circuit 208, bin control circuit 204, or another circuit) stores wave slot data indicative of previous lane positions and wave assignments so as to reduce downstream lane state motion. For example, in some implementations, SWC circuit 136 is paired with a palette of lane state transfer mechanisms implementing a pure software "spill before" model. However, in other implementations, SWC circuit 136 does not store or otherwise does not use lane state information and thus is independent of the lane state save/restore/transfer mechanism.

As discussed below with reference to FIGS. 4 and 5, in some implementations, one or more sort bins are used to store state values corresponding to sort keys received at a frequency less than a frequency threshold (e.g., having a frequency value less than the frequency threshold). These bins are called "junk bins" herein. Although these junk bins have a high amount of thread divergence, this divergence would occur regardless of whether the corresponding threads are separated from other threads or not because these corresponding threads are uncommon. Accordingly, by removing these threads from other groups of threads having less thread divergence, in some cases, overall thread divergence is reduced.

In some implementations, in response to an indication that a wave is needed (e.g., because shader circuitry 132 is about to run out of instructions) but emit wave circuit 208 does not store a complete wave, bin control circuit 204 merges the contents of at least two of sort bins 206 so as to create a complete wave to be emitted as an SWC wave. Although such a combination necessarily results in a wave having thread divergence, in some cases, the thread divergence of the wave is still an improvement over thread divergence of waves received at SWC circuit 136.

Figure 3:
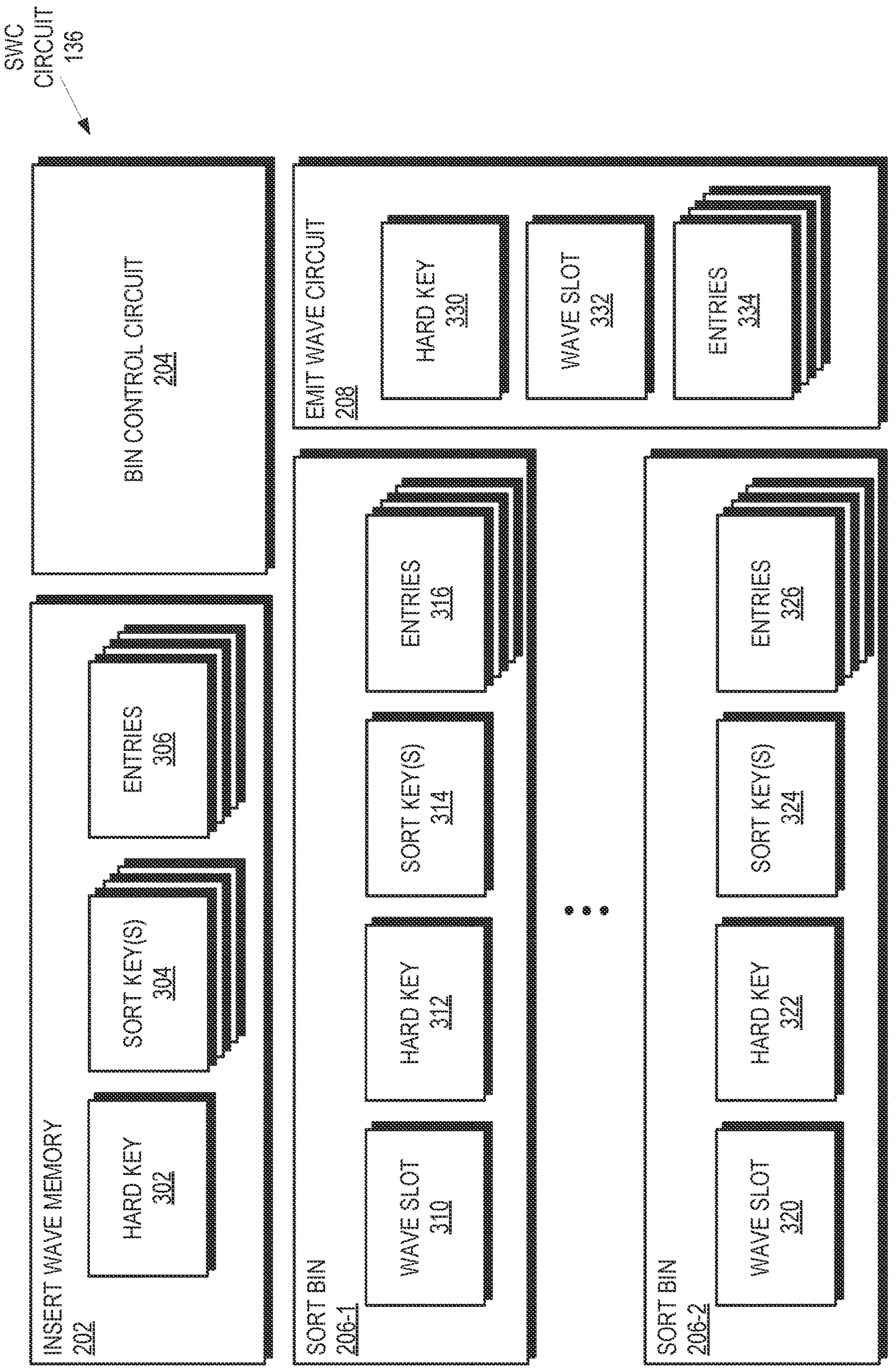
FIG. 3 is a block diagram of an example streaming wave coalescer circuit in accordance with some implementations.

FIG. 3 is a block diagram illustrating an example SWC circuit 136 in accordance with some implementations. In some implementations, SWC circuit 136 corresponds to SWC circuit of FIGS. 1 and 2. For example, SWC circuit 136 includes insert wave memory 202, bin control circuit 204, sort bin 206-1, sort bin 206-2, and emit wave circuit 208 of FIG. 2. However, in other implementations, SWC circuit 136 corresponds to a different system that includes additional or fewer components than processing system 100. In the illustrated implementation, insert wave memory 202 includes hard key storage 302, sort key storage 304, and entry storage 306. Sort bin 206-1 includes wave slot storage 310, hard key storage 312, sort key storage 314, and entry storage 316. Sort bin 206-2 includes wave slot storage 320, hard key storage 322, sort key storage 324, and entry storage 326. Emit wave circuit 208 includes hard key storage 330, wave slot storage 332, and entry storage 334. In some implementations, SWC circuit 136 includes additional or fewer components. For example, in some implementations, SWC circuit 136 does not track wave slots and does not include wave slot storage 310, wave slot storage 320, or wave slot storage 332.

As discussed above, insert wave memory 202 receives a wave, including indications of state values associated with threads of the wave and corresponding sort keys indicative of groups of instructions to be executed as part of execution of the respective threads. Further, in some implementations, insert wave memory 202 receives a hard key indicative of a separation between waves (e.g., indicative of different applications, dispatches, or thread-groups). In the illustrated implementation, insert wave memory 202 stores a received hard key in hard key storage 302, received sort keys in sort key storage 304, and received state values in entry storage 306. As discussed above, the received state values are then separated by bin control circuit 204 and stored in sort bins 206 based on corresponding sort keys and the hard key.

As discussed above, sort bins 206 fill with state values corresponding to one or more sort keys as waves are received and threads having hard keys and sort keys corresponding to sort bins 206 are identified. Sort bin 206-1 stores the corresponding wave slot in wave slot storage 310, the corresponding hard key in hard key storage 312, one or more corresponding sort keys in sort key storage 314, and state values in entry storage 316. Similarly, sort bin 206-2 stores the corresponding wave slot in wave slot storage 320, the corresponding hard key in hard key storage 322, one or more corresponding sort keys in sort key storage 324, and state values in entry storage 326. Sort bin 206-1 stores state values corresponding to a different hard key a different sort key, or both than state values stored at sort bin 206-2. When a sort bin is filled (e.g., all entries of entry storage 316 are occupied), bin control circuit 204 causes contents of the sort bin to be transferred to emit wave circuit 208. In some implementations, subsequent to the contents of the sort bin being transferred to emit wave circuit 208, the sort bin is no longer associated with a particular hard key, sort key, or both, and is free to store a different group of state values corresponding to a different hard key, sort key, or both.

As discussed above, the corresponding group of threads are reconstituted into a wave and emitted at emit wave circuit 208. In particular, a hard key is received and stored at hard key storage 330, a wave slot is received and stored at wave slot storage 332, and state values are received and stored at entry storage 334. The threads corresponding to the state values are then combined and output as a reconstituted wave.

Figure 4:
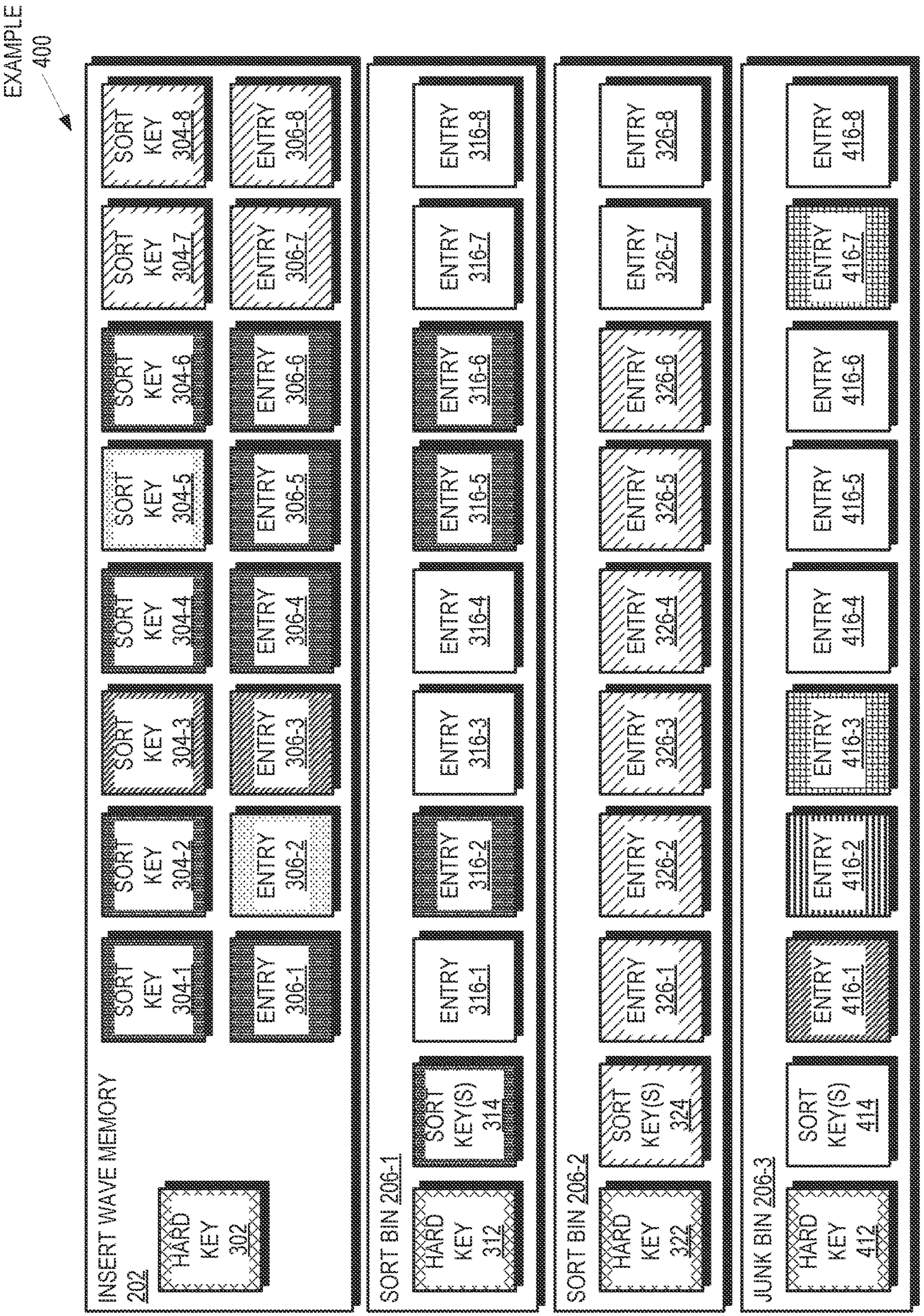
FIG. 4 is a block diagram showing a first example of a streaming wave coalescer circuit sorting and reconstituting a received wave in accordance with some implementations.
Figure 5:
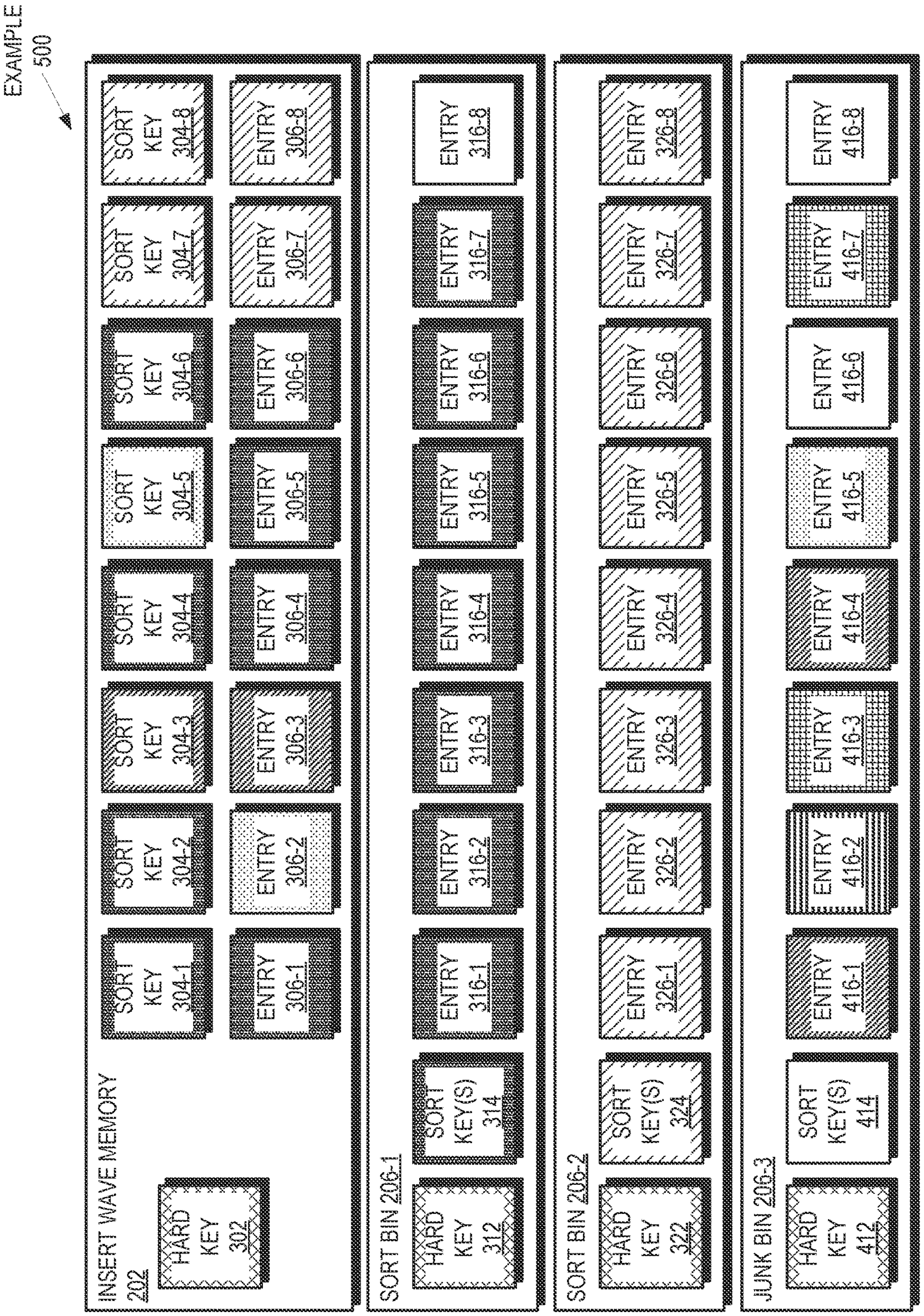
FIG. 5 is a block diagram showing a second example of a streaming wave coalescer circuit sorting and reconstituting a received wave in accordance with some implementations.

FIGS. 4 and 5 collectively depict a process of receiving a wave at a SWC circuit such as SWC circuit 136 of FIGS. 1-3, storing corresponding state values in entries of sort bins, and identifying a wave to be reconstituted and emitted by an emit wave circuit such as emit wave circuit 208 of FIGS. 1-3. Values of hard keys, sort keys, and the state values corresponding to the sort keys are depicted using patterns for ease of viewing. No pattern corresponds to no data stored in that location except as otherwise specified. In the illustrated examples, a same hard key is used in each insert wave memory and sort bin for simplicity, but in other cases, some sort bins store data corresponding to a different hard key. Further, in the illustrated examples, wave slots are not tracked. However, in other implementations, as discussed above, wave slots are tracked and used as hints for downstream bin emission.

FIG. 4 is a block diagram depicting an example 400 showing a first portion of an example of an SWC circuit sorting and reconstituting a received wave in accordance with some implementations. Example 400 depicts insert wave memory 202, sort bin 206-1, sort bin 206-2, and junk bin 206-3. In the illustrated example, junk bin 206-3 is a sort bin configured to act as a junk bin. Insert wave memory 202 includes hard key storage 302, sort key storage 304 depicted as sort key entries 304-1 through 304-8, and entry storage 306 depicted as entries 306-1 through 306-8. Sort bin storage 206-1 includes hard key storage 312, sort key storage 314, and entry storage 316 depicted as entries 316-1 through 316-8. Sort bin storage 206-2 includes hard key storage 322, sort key storage 324, and entry storage 326 depicted as entries 326-1 through 326-8. Junk bin storage 206-3 includes hard key storage 412, sort key storage 414, and an entry storage depicted as entries 416-1 through 416-8. Although only eight entries are illustrated for simplicity, in other implementations, additional or fewer entries are contemplated.

Example 400 depicts a SWC circuit where a wave is received and stored at insert wave memory 202 and data corresponding to previous waves is already stored at sort bin 206-1, sort bin 206-2, and junk bin 206-3. In the illustrated example, sort bin 206-1 stores state values in entries 316-2, 316-5, and 316-6 corresponding to a single hard key, stored or otherwise indicated in hard key storage 312 and a single sort key, stored or otherwise indicated in sort key storage 314. Sort bin 206-2 stores state values in entries 326-1, 326-2, 326-3, 326-4, 326-5, and 326-6 corresponding to a single hard key, stored or otherwise indicated in hard key storage 322 and a single sort key, stored or otherwise indicated in sort key storage 324. Junk bin 206-1 stores state values in entries 416-1, 416-2, 416-3, and 416-7. The state value in entry 416-1 corresponds to a first sort key, the state value in entry 416-2 corresponds to a second sort key, and the state values in entries 416-3 and 416-7 correspond to a third sort key. The state values stored in junk bin 206-3 all correspond to a single hard key, stored or otherwise indicated in hard key storage 412. In the illustrated example, the sort keys corresponding to the state values stored in junk bin 206-3 are all stored or otherwise indicated in sort key storage 414, which is not shaded for simplicity.

In the illustrated example, the sort keys of sort key storage 314 and sort key storage 324 have frequency values greater than or equal to a frequency threshold. The sort keys of sort key storage 414 have frequency values less than the frequency threshold. In other implementations, other ways of determining whether to use junk bin 206-3 are contemplated (e.g., if the frequency value is equal to the frequency threshold, the keys are stored at junk bin 206-3).

FIG. 5 is a block diagram depicting an example 500 showing a second portion of an example of an SWC circuit sorting and reconstituting a received wave in accordance with some implementations. Example 500 depicts insert wave memory 202, sort bin 206-1, sort bin 206-2, and junk bin 206-3. In the illustrated example, junk bin 206-3 is a sort bin configured to act as a junk bin. Insert wave memory 202 includes hard key storage 302, sort key storage 304 depicted as sort key entries 304-1 through 304-8, and entry storage 306 depicted as entries 306-1 through 306-8. Sort bin storage 206-1 includes hard key storage 312, sort key storage 314, and entry storage 316 depicted as entries 316-1 through 316-8. Sort bin storage 206-2 includes hard key storage 322, sort key storage 324, and entry storage 326 depicted as entries 326-1 through 326-8. Junk bin storage 206-3 includes hard key storage 412, sort key storage 414, and an entry storage depicted as entries 416-1 through 416-8. Although only eight entries are illustrated for simplicity, in other implementations, additional or fewer entries are contemplated.

As discussed above, the SWC circuit moves entries from insert wave memory 202 into sort bins with corresponding sort keys and hard keys. Example 500 depicts the example of example 400 of FIG. 4 except data has been copied from insert wave memory 202 into sort bin 206-1, sort bin 206-2, and junk bin 206-3. The previous positions of the data in insert wave memory 202 is included for ease of understanding. However, in some implementations, after data in insert wave memory 202 is data is copied from insert wave memory 202 to sort bin 206-1, sort bin 206-2, junk bin 206-3, or any combination thereof, the data is deleted to ready insert wave memory 202 to receive new data.

More specifically, in example 500, the state value from entry 306-1 has been moved to entry 316-1, the state value from entry 306-2 has been moved to entry 416-5, the state value from entry 306-3 has been moved to entry 416-4, the state value from entry 306-4 has been moved to entry 316-4, the state value from entry 306-5 has been moved to entry 316-3, the state value from entry 306-6 has been moved to entry 316-7, the state value from entry 306-7 has been moved to entry 326-7, and the state value from entry 306-8 has been moved to entry 326-8. In the illustrated example, the SWC circuit attempted to preserve relative positions of state values while merging entries (e.g., entry 306-4 was moved to entry 316-4 and entry 306-5 was moved to entry 316-3). However, in other implementations, the relative positions are not used while merging entries.

As a result of moving the state value of entry 306-7 to entry 326-7 and the state value of entry 306-8 to entry 326-8, sort bin 206-2 is full. Accordingly, in response to detecting that sort bin 206-2 is full, the state values stored at sort bin 206-2 are sent to an emit wave circuit such as emit wave circuit 208 of FIG. 3 for emission as part of an SWC wave. Accordingly, a process of receiving, storing corresponding state values in entries of sort bins, and identifying a wave to be reconstituted and emitted is depicted.

Figure 6:
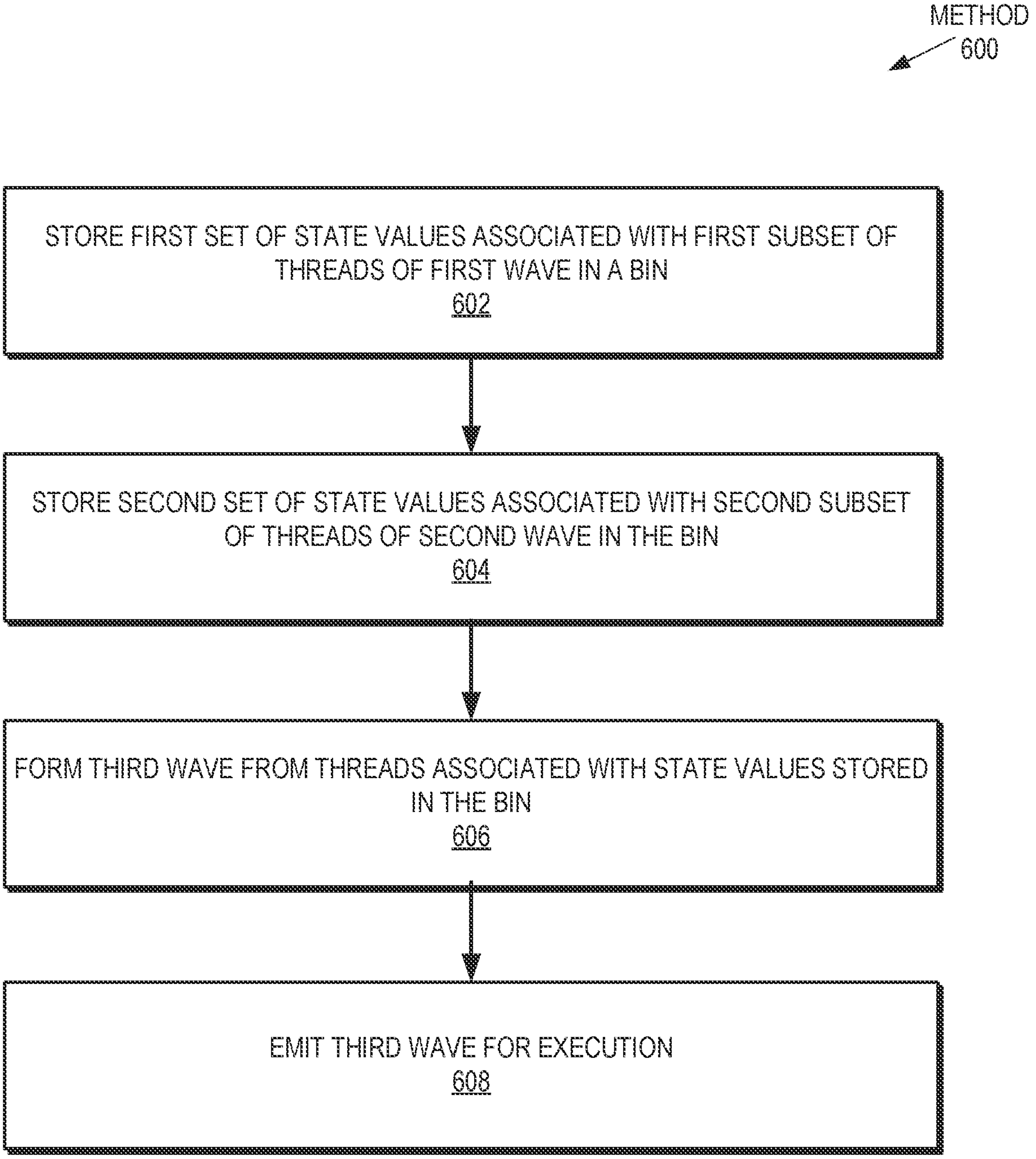
FIG. 6 is a flow diagram of a method of sorting and reconstituting a received wave in a streaming wave coalescer circuit in accordance with some implementations.

FIG. 6 is a flow diagram illustrating a method 600 of sorting and reconstituting a received wave in an SWC circuit in accordance with some implementations. In some implementations, various portions are performed in another order. In some implementations, method 600 is initiated by one or more processors in response to one or more instructions stored by a computer readable storage medium.

At block 602, a first set of state values associated with a first subset of threads of a first wave are stored in a bin. For example, state values associated with a first subset of threads of a first wave are stored in sort bin 206-2 of FIG. 3. At block 604, a second set of state values associated with a second subset of threads of a second wave are stored in the bin. For example, state values associated with a second subset of threads of a second wave are stored in sort bin 206-2.

At block 606, a third wave is formed from the threads associated with the state values stored in the bin. For example, a wave is formed at emit wave circuit 208 from the threads associated with the state values of the first subset of threads and the second subset of threads. At block 608, a third wave is emitted for execution. For example, the wave formed at emit wave circuit 208 is emitted as an SWC wave to shader circuitry 132 for execution. Accordingly, a method of sorting and reconstituting a received wave in an SWC circuit is depicted.

In some implementations, a computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), or Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. In some implementations, the computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some implementations, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. In some implementations, the executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device are not required, and that, in some cases, one or more further activities are performed, or elements included, in addition to those described. Still further, the order in which activities are listed are not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that cause any benefit, advantage, or solution to occur or become more pronounced are not to be construed as a critical, required, or essential feature of any or all the claims. Moreover, the particular implementations disclosed above are illustrative only, as the disclosed subject matter could be modified and practiced in different but equivalent manners apparent to those skilled in the art having the benefit of the teachings herein. No limitations are intended to the details of construction or design shown herein, other than as described in the claims below. It is therefore evident that the particular implementations disclosed above could be altered or modified and all such variations are considered within the scope of the disclosed subject matter. Accordingly, the protection sought herein is as set forth in the claims below.

One or more of the elements described above is circuitry designed and configured to perform the corresponding operations described above. Such circuitry, in at least some implementations, is any one of, or a combination of, a hardcoded circuit (e.g., a corresponding portion of an application specific integrated circuit (ASIC) or a set of logic gates, storage elements, and other components selected and arranged to execute the ascribed operations), a programmable circuit (e.g., a corresponding portion of a field programmable gate array (FPGA) or programmable logic device (PLD)), or one or more processors executing software instructions that cause the one or more processors to implement the ascribed actions. In some implementations, the circuitry for a particular element is selected, arranged, and configured by one or more computer-implemented design tools. For example, in some implementations the sequence of operations for a particular element is defined in a specified computer language, such as a register transfer language, and a computer-implemented design tool selects, configures, and arranges the circuitry based on the defined sequence of operations. "Circuitry" and "circuit" are used throughout this disclosure interchangeably.

Within this disclosure, in some cases, different entities (which are variously referred to as "components," "units," "devices," "circuitry," etc.) are described or claimed as "configured" to perform one or more tasks or operations. This formulation-[entity] configured to [perform one or more tasks]—is used herein to refer to structure (i.e., something physical, such as electronic circuitry). More specifically, this formulation is used to indicate that this physical structure is arranged to perform the one or more tasks during operation. A structure can be said to be "configured to" perform some task even if the structure is not currently being operated. A "memory device configured to store data" is intended to cover, for example, an integrated circuit that has circuitry that stores data during operation, even if the integrated circuit in question is not currently being used (e.g., a power supply is not connected to it). Thus, an entity described or recited as "configured to" perform some task refers to something physical, such as a device, circuitry, memory storing program instructions executable to implement the task, etc. This phrase is not used herein to refer to something intangible. Further, the term "configured to" is not intended to mean "configurable to." An unprogrammed field programmable gate array, for example, would not be considered to be "configured to" perform some specific function, although it could be "configurable to" perform that function after programming. Additionally, reciting in the appended claims that a structure is "configured to" perform one or more tasks is expressly intended not to be interpreted as having means-plus-function elements.

What is claimed is:

1. A method comprising:
storing, in a first bin, state values of threads of a first wave and a second wave that are associated with a first hard key and that include a first set of instructions corresponding to a first sort key;
storing, in a second bin different from the first bin, state values of threads associated with a second hard key;
forming a third wave of threads from the first wave and the second wave using the first bin, wherein the third wave of threads includes:
a first subset of threads of the first wave from the first bin responsive to each of the first subset of threads including the first set of instructions corresponding to the first sort key; and
a second subset of threads of the second wave from the first bin responsive to each of the second subset of threads including the first set of instructions corresponding to the first sort key; and emitting the third wave for execution.

2. The method of claim 1, further comprising:
storing state values associated with a third subset of threads of the first wave into a third bin responsive to each of the third subset of threads including a second set of instructions corresponding to a second sort key.

3. The method of claim 2, further comprising:
sorting the third subset of threads stored in the third bin based on the second sort key, wherein the first and second sort keys are indicative of the first set of instructions to be executed and the second set of instructions to be executed, respectively.

4. The method of claim 1, further comprising:
storing state values associated with a fourth subset of threads of a fourth wave into the second bin, the fourth subset of threads including threads corresponding to a second sort key different from the first sort key, wherein the second hard key is associated with the fourth wave.

5. The method of claim 4, further comprising:
forming a fifth wave of threads using the second bin, wherein the fifth wave includes the fourth subset of threads and is emitted for execution.

6. The method of claim 1, wherein:
the first sort key is received from a user.

7. The method of claim 1, wherein:
the first wave is received in response to a compiler determination that the first wave has diverged by at least a threshold amount.

8. The method of claim 1, wherein:
the first wave is received in response to a programmer-specified instruction that indicates that the first wave is expected to have diverged by at least a threshold amount.

9. A streaming wave coalescer (SWC) circuit comprising:
an insert wave memory configured to receive wave data comprising a plurality of threads from a first wave and a second wave;
a first bin configured to store state values of threads associated with a first hard key from the first wave and the second wave, wherein a third wave is formed using the first bin comprising:
a first subset of threads of the first wave based on the first subset of threads corresponding to a first sort key; and
a second subset of threads of the second wave based on the second subset of threads corresponding to the first sort key;
a second bin configured to store state values of threads associated with a second hard key, the second bin being different from the first bin; and
an emit wave circuit configured to emit the third wave for execution.

10. The SWC circuit of claim 9, wherein:
a third bin is configured to store state values of threads received at the insert wave memory, each thread corresponding to a sort key different from the first sort key used to form the third wave.

11. The SWC circuit of claim 9, further comprising: the emit wave circuit configured to:
store an SWC wave from the first bin in response to an indication that the SWC wave is complete; and
emit the SWC wave to shader circuitry for execution.

12. The SWC circuit of claim 11, wherein:
the first bin is further configured to send stored state values, including the first subset and the second subset, to the emit wave circuit as the SWC wave in response to detecting that each entry of the first bin is full.

13. The SWC circuit of claim 12, wherein: subsequent to the first sort bin sending the first set of state values to the emit wave circuit, a third bin is configured to store state values associated with a third subset of threads associated with the first hard key and a second sort key.

14. The SWC circuit of claim 13, further comprising:

a merge wave circuit configured to form a fourth wave of threads from the third bin, the fourth wave comprising the threads stored in the third bin, and to emit the fourth wave for execution.

15. The SWC circuit of claim 9, further comprising:

a junk bin configured to store state values associated with threads received at the insert wave memory and corresponding to sort keys having a frequency value less than a frequency threshold.

16. A processing system, comprising:

a bus;

a first processing circuit configured to issue a plurality of commands via the bus; and a second processing circuit configured to receive the plurality of commands from the first processing circuit, and comprising:

dispatch circuitry comprising:

an insert wave memory configured to receive wave data comprising a plurality of threads from a wave feed; and a sort memory configured to store a set of state values associated with a subset of threads received at the insert wave memory based on the subset of threads being associated with a same hard key and same sort key; and shader circuitry configured to process the plurality of threads.

17. The processing system of claim 16, wherein the dispatch circuitry further comprises:

a memory control circuit configured to:

separate the plurality of threads of the wave data based on corresponding hard keys and corresponding sort keys and store the set of state values in the sort memory.

18. The processing system of claim 17, wherein:

storing the set of state values in the sort memory comprises prioritizing preserving original lane positions of the corresponding subset of threads, wherein the original lane positions correspond to locations of the subset of threads within the wave data.

19. The processing system of claim 17, wherein the memory control circuit is further configured to:

merge threads corresponding to at least two sort memories and corresponding to a same hard key into a single wave in response to a request for a wave and a determination that a wave is not ready to be emitted.

20. A streaming wave coalescer (SWC) circuit comprising:

a memory configured to receive wave data comprising a plurality of threads from wave feed;

a first sort bin configured to store a first set of state values associated with a first subset of threads received at the memory based on the first subset of threads corresponding to a first sort key;

a second sort bin configured to store a second set of state values associated with a second subset of threads received at the memory based on the second subset of threads corresponding to a second sort key; and a third sort bin configured to store a third set of state values associated with a third subset of threads received at the memory and corresponding to sort keys having a frequency value less than a frequency threshold.

* * * * *